Patented Jan. 13, 1931

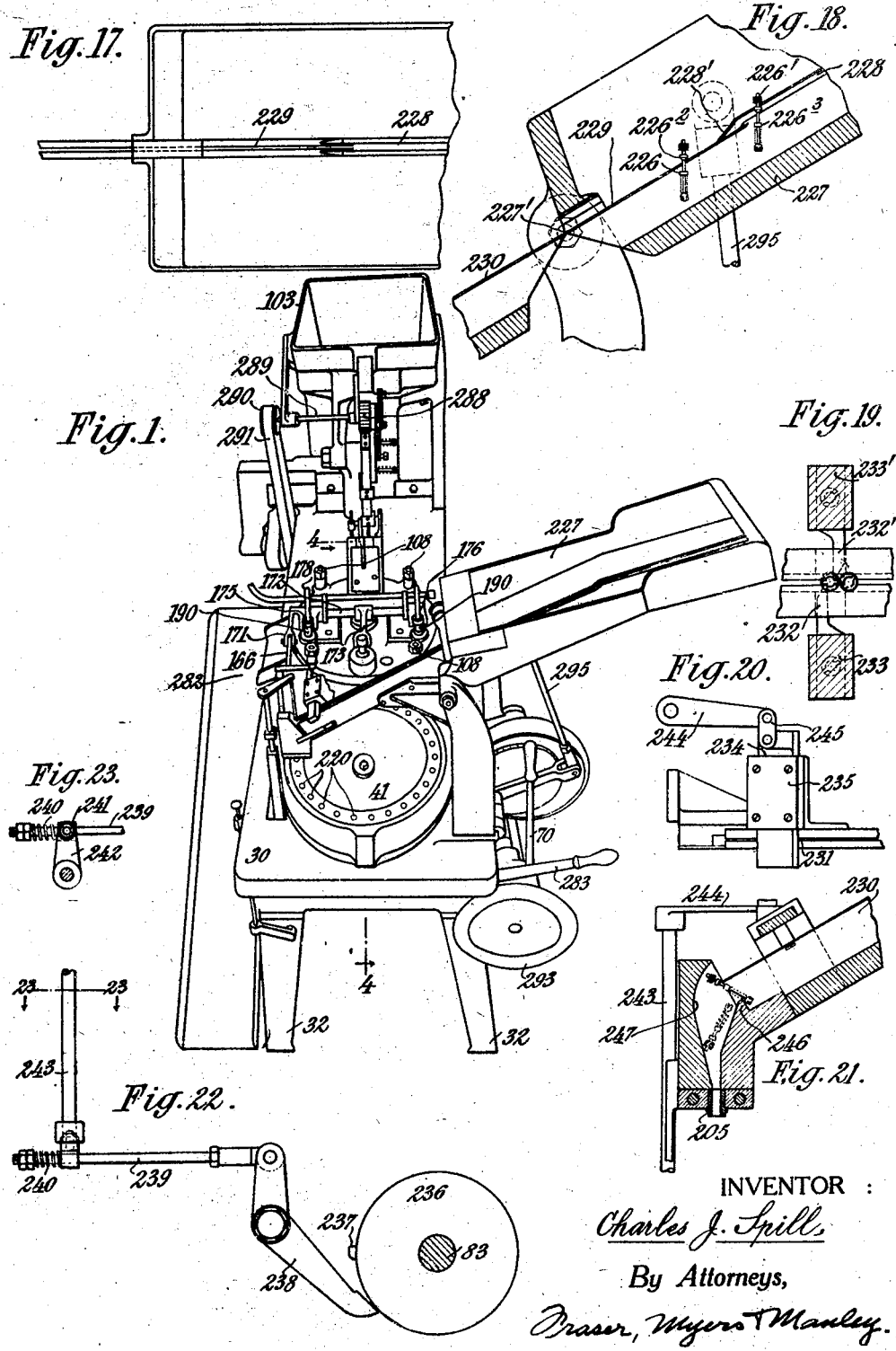

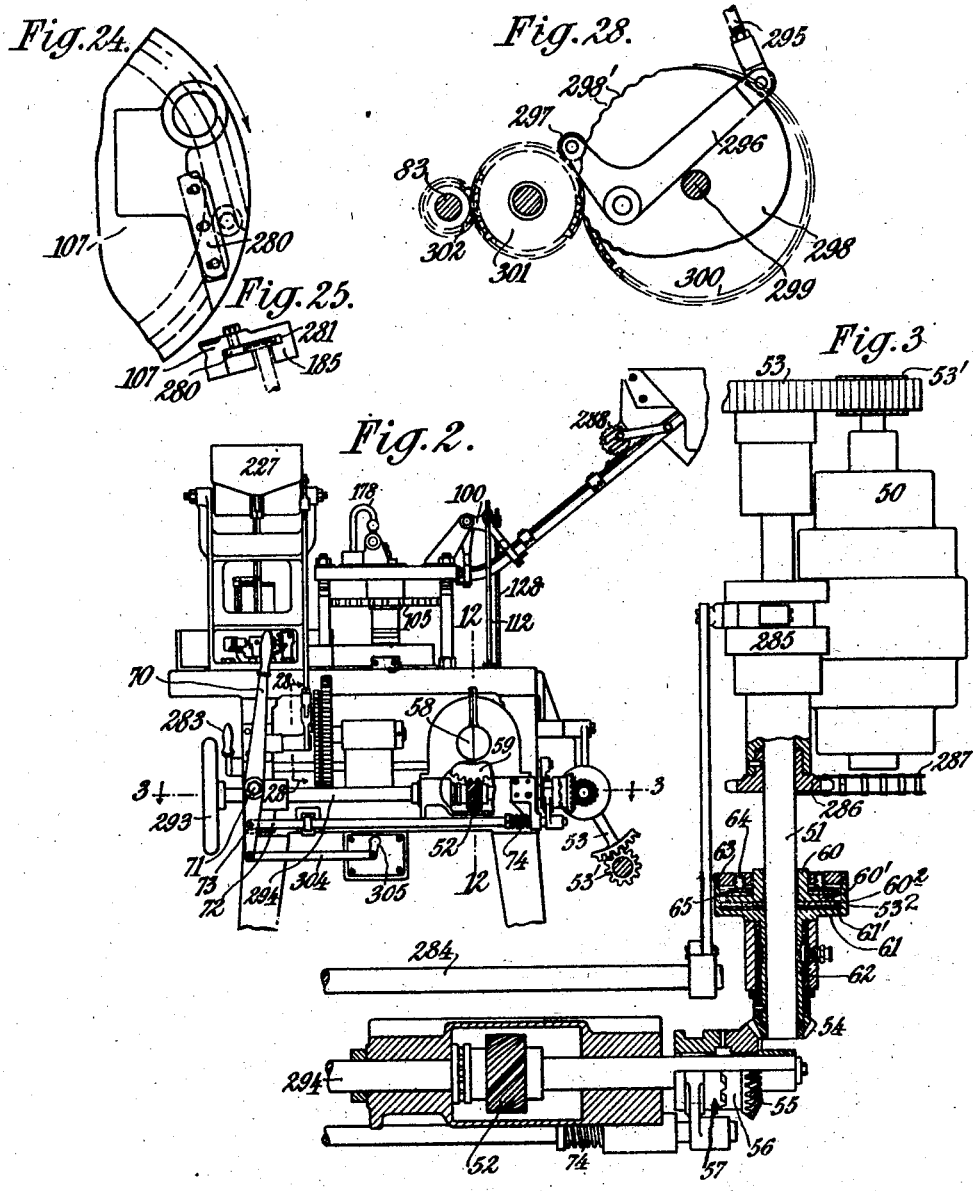

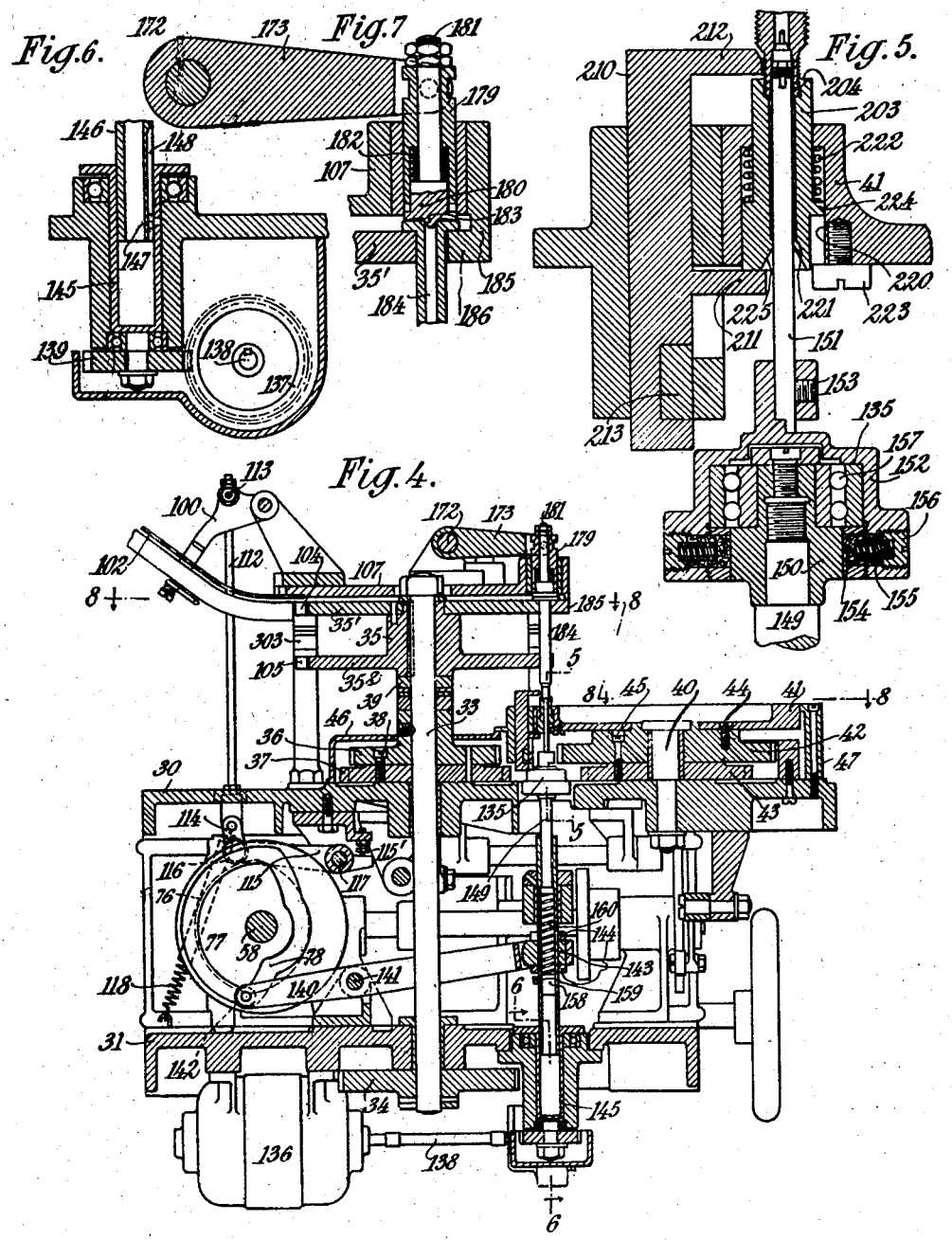

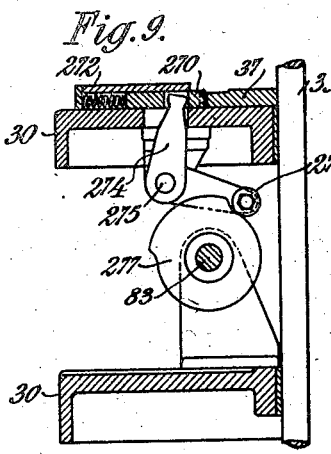
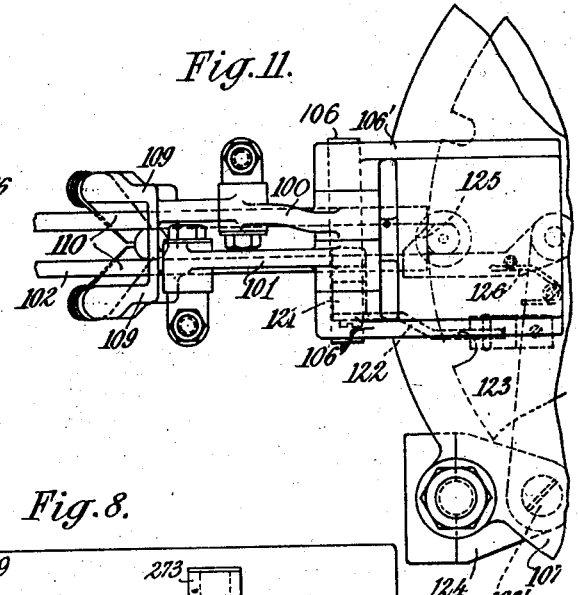
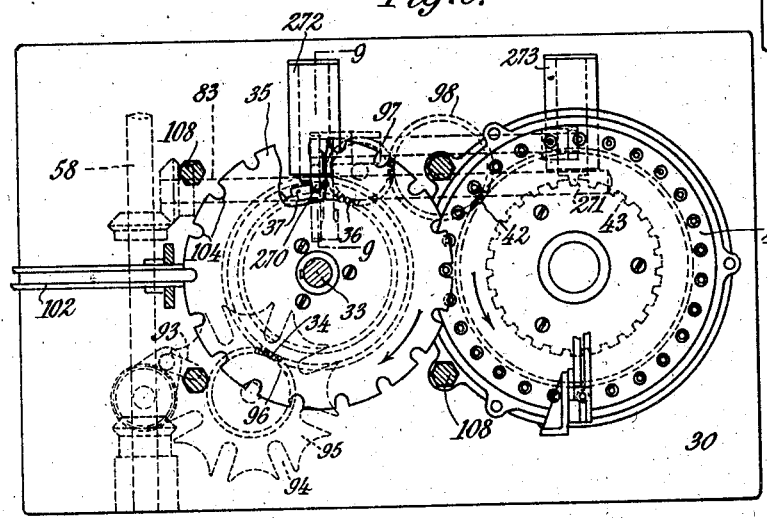
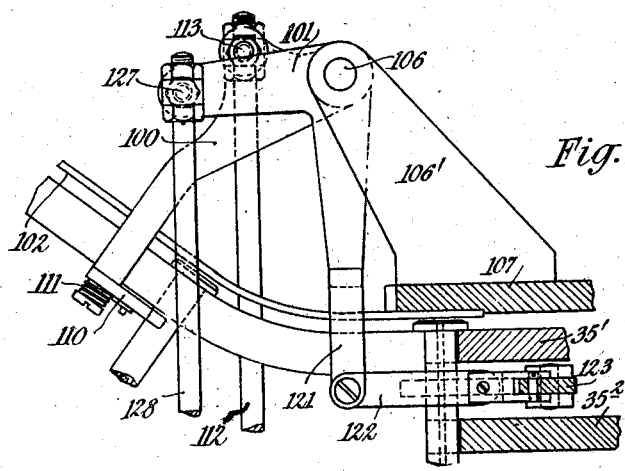

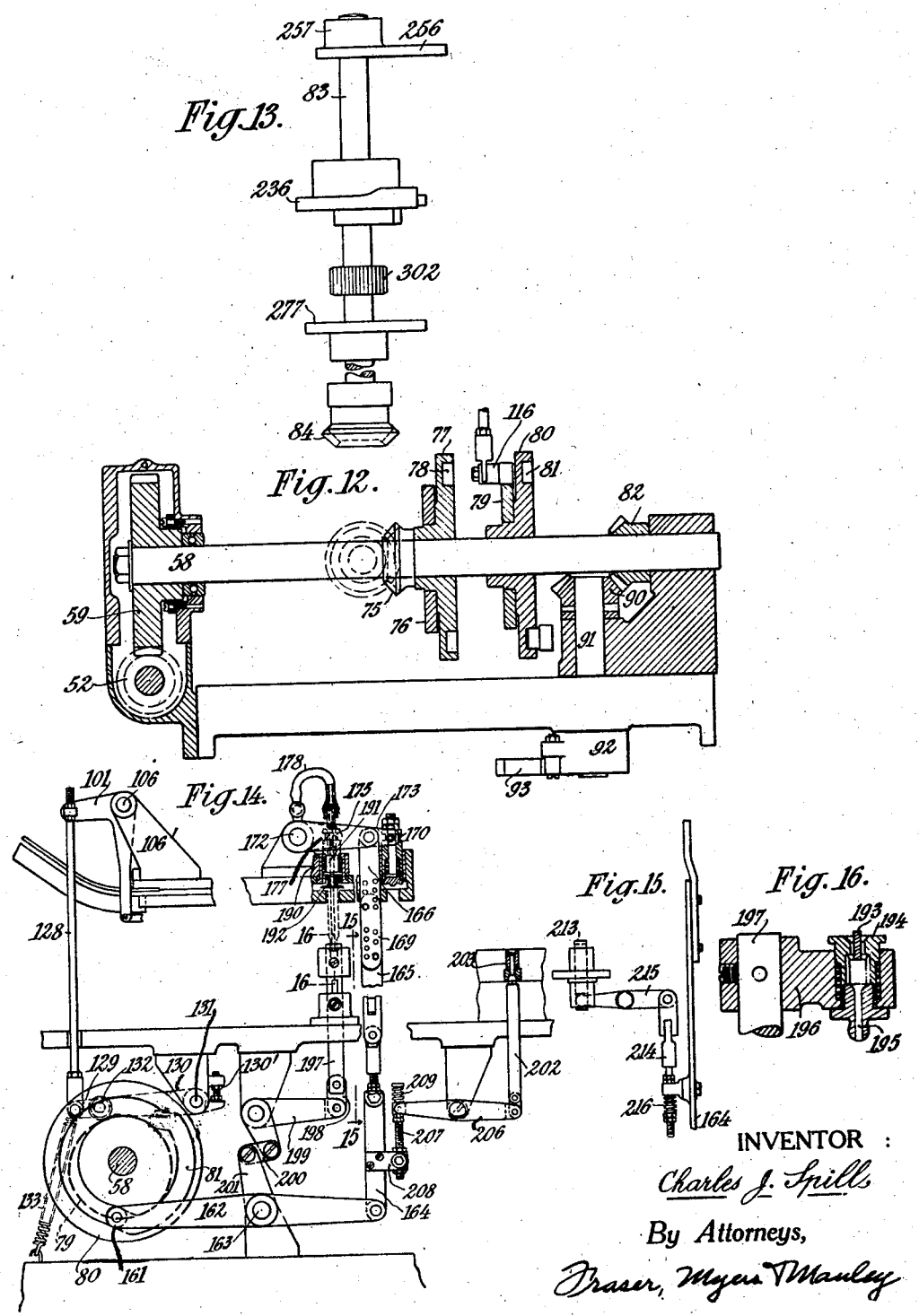

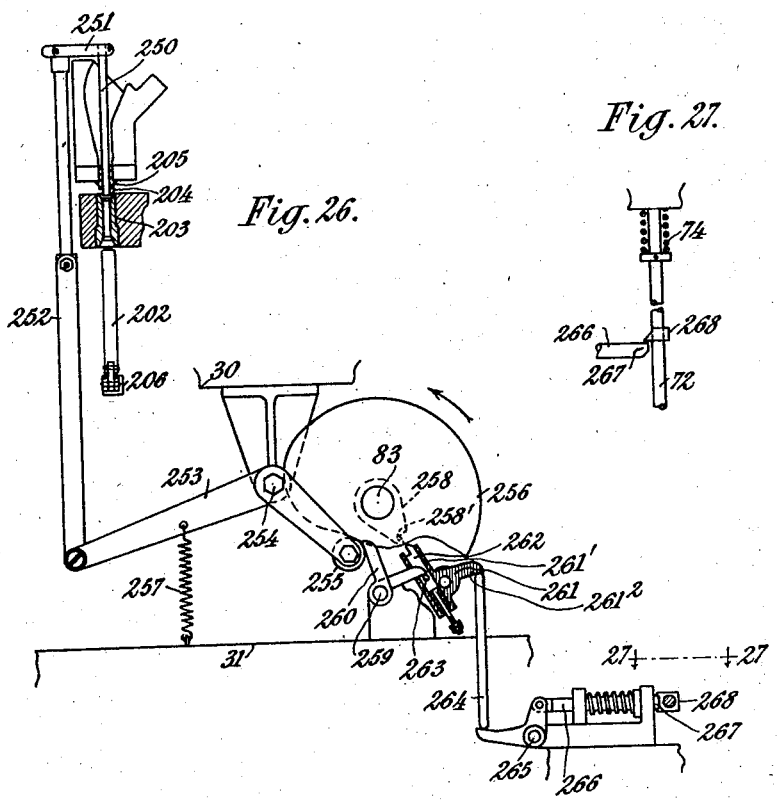

1,788,601

UNITED STATES PATENT OFFICE

CHARLES J. SPILL, OF GARDEN CITY, NEW YORK, ASSIGNOR TO A. SCHRADER'S SON, INC., OF BROOKLYN, NEW YORK, A CORPORATION OF NEW YORK

ASSEMBLING MACHINE

Application filed October 31, 1927. Serial No. 229,899.

The present invention relates to a machine for assembling externally screw-threaded parts and internally screw-threaded parts together, and more specifically to a machine for assembling tire valve insides into valve stems.

In its broadest aspect the invention relates to a machine for assembling externally screw-threaded parts and internally screw-threaded parts together, and comprises means for feeding said respective parts to a point whereat they will be in superposed aligned position, and means for rotating one of said respective parts relatively to the other when in such aligned position to cause one part to screw-threadedly engage the other part.

The invention in its more specific aspect has to do with the automatic assembling of valve insides into valve stems and comprises feed hoppers adapted to automatically feed said valve stems and valve insides to respective slides or tracks, from which they are in turn fed to relatively rotatable receiving turrets having suitable openings or recesses to receive said parts, said turrets being so positioned relatively to each other that the openings in the one have a common axis with the openings in the other at a given point, and a screw-driver movable along said common axis. Means are provided for intermittently moving the turrets to successively bring the openings in the one into alignment with the openings in the other at said given point and for feeding the valve stems and valve insides singly into their respective turrets in timed relation to the intermittent movement of said turrets, there being also provided means for moving the screw driver along its axis every time a pair of openings or recesses are brought into alignment, so that when the screw driver is so moved it will screw the valve insides into the valve stem. A suitable discharge opening is provided for discharging the assembled valve stems from the machine so that the assembling operation can proceed uninterruptedly.

The invention also contemplates other features of novelty which will be hereinafter more fully described.

An embodiment of my invention is illustrated in the accompanying drawings, wherein Figure 1 is a perspective view of the complete machine.

Fig. 2 is a side elevation with parts broken away, of the machine shown in Fig. 1.

Fig. 3 is a section taken substantially along the plane of the line 3—3 in Fig. 2.

Fig. 4 is a section taken substantially along the plane of the line 4—4 of Fig. 1.

Fig. 5 is an enlarged section taken along the line 5—5 of Fig. 4.

Fig. 6 is an enlarged section taken along the line 6—6 of Fig. 4.

Fig. 7 is an enlarged section of the valve stem clamping means shown in Fig. 4.

Fig. 8 is a section taken substantially along the planes of the broken line 8—8 in Fig. 4.

Fig. 9 is an enlarged section taken substantially along the line 9—9 of Fig. 8.

Fig. 10 is a side elevation of the valve stem feed arms.

Fig. 11 is a top plan of the feed arms shown in Fig. 10.

Fig. 12 is a section through the primary cam shaft and taken along the line 12—12 of Fig. 2.

Fig. 13 is a top elevation of the secondary cam shaft which extends at a right-angle to and is driven by the primary cam shaft.

Fig. 14 is an elevation partly in section showing the control of the valve stem foot clamping means and the compressed air control.

Fig. 15 is a fractional elevation taken along the line 15—15 of Fig. 14.

Fig. 16 is an enlarged section taken along the line 16—16 of Fig. 14.

Figs. 17 and 18 are a fractional top plan view and longitudinal section respectively of the valve insides feed hopper.

Figs. 19, 20 and 21 are details of the valve insides single feed controlling means.

Fig. 22 is a fractional elevation of the controlling means for the single feed control shown in Figs. 19 to 21.

Fig. 23 is a section taken along the line 23—23 of Fig. 22.

Figs. 24 and 25 are a fractional top plan and side elevation respectively of the discharging means for the assembled valve stems.

Fig. 26 is a side elevation of the testing means for the fed valve insides and its operating mechanism.

Fig. 27 is a top plan view taken along the lines 27—27 of Fig. 26.

Fig. 28 is a section taken substantially along the line 28—28 of Fig. 2 and shows in elevation the driving and controlled means for operating the valve insides hopper.

Referring first to Figs. 1, 4 and 8 of the drawings, the reference character 30 indicates a base support and 31 a sub-base support for the machine mounted upon standards 32. Passing through suitable bushings in the supports 30 and 31 so as to be freely rotatable therein is a shaft 33 carrying at its lower end a gear 34, and at its upper end a turret 35 which is keyed to said shaft. Also mounted on said shaft to be rotatable therewith between the underside of the turret 35 and the top of the support 30 are gears 36 and 37, the latter being secured to the former through the medium of bolts 38. Between the top of a bushing carried by the gear 36 and the underside of the turret 35 are a plurality of spacing washers 39 encircling the shaft 33. Also carried by the support 30 in spaced parallel relation to the shaft 33 is a fixed stud shaft 40 upon which are mounted to freely rotate a turret 41 and gears 42 and 43, said turret and gears being affixed to each other through suitable bolts 44 and 45. To keep dirt and foreign substances from coming in contact with the gears 36 and 37, a suitable cover plate 46 is provided, and for the purpose of protecting gears 42 and 43, a cover element 47 fixedly carried by the supporting member 30 is provided.

Referring now to Figs. 2, 3 and 8, reference character 50 indicates a motor adapted to supply power for operating the machine, which power is communicated to the primary drive shaft 51 through meshing gears 53 and 53'; and from the main drive shaft 51 to the spiral gear 52 through a friction clutch $53^2$, miter-gears 54 and 55 and jaw clutch 56, 57. From the spiral gear 52 power is communicated to the primary cam shaft 58 through the spiral gear 59 fixed upon said shaft. The friction clutch 53 may be of any preferred construction, and as herein shown, comprises a bushing 60 fixed on the shaft 51, said bushing having a disk flange 60' which carries a disk of packing material $60^2$ adapted to frictionally engage a disk packing 61' carried by a flange disk 61 mounted on a bushing 62 loosely mounted on the shaft 51, the said bushing 62 carrying at its free end a miter-gear 54.

The flange disk 61 carries a nut 63 provided with springs 64 adapted to press against disks of friction material 65 at the rear side of disk 60'.

The clutch element 57 is controlled by the lever 70 which is pivoted at 71 and operates through the connecting rod 72 pivoted to the lever 70 at 73, said connecting rod carrying a helical spring 74 which normally has a tendency to disengage the clutching elements but which is held under compression when the lever 70 is in the position shown in Fig. 2.

Referring now to Fig. 12: Mounted upon the primary cam shaft 58 in the following order with respect to the spiral gear 59 are a miter-gear 75, a cam 76, a disk 77 provided with a cam track 78, a cam 79, a second disk 80 provided with a cam track 81 and a second miter-gear 82. The miter-gear 75 drives a secondary cam shaft 83 through engagement with the miter-gear 84. The functions of the elements 76 to 81 will be hereinafter described in detail. The miter-gear 82 is in mesh with a miter-gear 90 affixed to a stub shaft 91 which carries at its lower end an element 92 provided with a lug 93 of a means for producing intermittent rotary movement. The lug 93 is adapted to engage in the recesses 94 of a star wheel 95 mounted on a stub shaft depending from the underside of the sub-base support 31, said stub shaft also carrying a gear 96 which is in mesh with the gear 34 carried by the shaft 33 (see Fig. 8). It will thus be seen that intermittent rotary movement is communicated to the shaft 33 and the turret 35 from the primary cam shaft 58 through the elements 82, 90 to 96 and 34. Coordinated intermittent movement is communicated to the turret 41 from the shaft 33 through the gear 36, stud gears 97 and 98 and gear 42. This will be most apparent from an inspection of Fig. 8 wherein the gear train 36, 97, 98 and 42 are all shown in broken line elevation.

Cam 76, hereinafter called the rear feed arm cam (best shown in broken lines in Fig. 4), controls the movement of the rear feed arm 100, which, in cooperation with the front feed arm 101, functions to feed valve stems coming down the inclined slide or track 102 from the hopper 103 to the openings or radial recesses 104, 105 formed in the peripheral edges of the disks 35' and $35^2$ of the turret 35. The rear feed arm 100 comprises a bell crank lever, one end of which is pivotally mounted upon a pin 106 carried by a pair of ears or lugs 106' mounted upon a cover plate 107 surmounting the turret 35, said cover plate being supported by the base support 30 in spaced relation to the turret 35 by four stud bolts 108. The opposite end of the rear feed arm lever 100 is bifurcated to provide a pair of arms 109 which straddle the slide 102, the free ends of said bifurcated arms carrying fingers 110 which are urged toward each other by springs 111 carried at the free ends of said arms 109. The free ends of the spring-pressed fingers 110 are so shaped as to engage the body of a valve stem and to move or urge the same downwardly along the slide 102 when said feed arm is making its downward stroke, said fingers 110 being adapted to be spread apart against the action of the spring means 111 through engagement with a valve stem to its rear when said feed arm is making its backward or upward stroke. Movement is imparted to the rear feed arm through the medium of the connecting rod 112, which is pivotally connected at its top to the angle of the bell crank 100 at 113, and at its bottom is pivotally connected to a link 114, which, in turn, is pivotally connected to a lever 115 which carries a roller 116 adapted to ride over the surface of the cam 76 (best shown in dotted lines in Fig. 4). The lever 116 is pivotally mounted at 117 and the roller 116 is always held in contact with the surface of the cam through the medium of a spring 118 exerting a downward pull on the long arm of the lever, said spring being connected at its opposite end to the sub-base support 31. The adjustable stop element 115′ carried by the underside of the base support 30 is provided to further limit the pivotal action of the lever 115.

The cam 79 hereinafter referred to as the front feed arm cam functions in a similar manner to the cam 76 to control the movement of the front feed arm 101, which comprises a bell crank lever pivotally supported at its angle upon the pin 106, the lower arm of which is angularly bent, as shown at 121, to straddle the slide 102, the free end of said arm being provided with a connecting link 122, which, in turn, is pivotally connected to a lever 123 positioned between the disks 35′ and 35² of the turret 35, said lever 123 being supported by a depending lug 124 carried by the cover plate 107 and pivoted to said support at 123′, as best shown in Figs. 10 and 11. The lever 123 pivotally carries at its free end a hook-like arm 125, which arm is urged to engaging position by a spring 126 carried by the lever 123 and engaging a pin on the arm 125. The end of the lever 123 to which the arm 125 is connected, is substantially in alignment with the center line of the slide 102, and said lever is movable about its pivot 123′ by the movement of the feed arm 101. Pivotally connected to the opposite end of the feed arm 101 at 127 is a connecting rod 128, the opposite end of which is pivotally connected to a link 129, which, in turn, is connected with the lever 130 which is pivotally mounted at 131. The lever 130 carries a roller 132 adapted to ride over the surface of the cam 79 (as shown in dotted lines in Fig. 14), there being provided a spring 133 which functions to hold the roller 132 in contact with the cam surface. An adjustable stop 130′ is carried by an element on the underside of the support 30 and serves to limit the pivotal action of the lever 130.

The movements of the feed arms 100 and 101 by their respective cams and connecting rods is so timed that they move substantially simultaneously in their downward stroke, but the rear feed arm remains temporarily stationary while the front feed arm begins its backward stroke, so that as such backward stroke is being made, the fingers 110 press against the valve stems in the slide and act as a stop to permit the beveled end of the hook-like arm 125 to ride past the first valve stem on the slide against the action of the spring 126 and to engage behind it immediately upon said hook passing said valve stem. In the downward movement of the front feed arm 101 it will be apparent that the hook 125 will carry with it a single valve stem and insure its proper positioning within the recesses 104 and 105 in the turret 35.

The disk-like element 77 is provided with a cam track 78, which cam is designed for controlling the longitudinal movement of a screw driver indicated generally by the reference character 135, said screw driver being rotatably driven by a separate motor 136 through the worm 137 carried by the shaft 138, and the worm gear 139 carried by the screw driver. Longitudinal movement of the screw driver 135 is accomplished through the medium of the lever 140 which is pivoted at 141, one end of said lever carrying a roller 142 movable within the cam track 78, and the other end of said lever being bifurcated, and said bifurcated end being pivoted to a collar 143 loosely encircling the screw driver and positioned between a pair of annular fixed collars 144 carried by the screw driver, so that movement of the collar 143 up or down will move the screw driver correspondingly.

The screw driver as herewith disclosed comprises a rotatable socket element 145 to which the worm gear 139 is affixed, which socket member, in turn, drives a tubular sleeve 146 through the medium of a pin and slot connection 147, 148; said tubular member 146, in turn, drives a stud shaft 149, provided at its outer end with a drum 150 which is adapted to frictionally drive the screw driver element proper 151 through the medium of a friction clutch carried by said screw driver proper 151. Said screw driver clutch comprises a housing 152 fixed to the screw driver, as shown at 153, said housing encircles the drum 150 and comprises a ring of friction material 154 in contact with said drum 150, the ring 154 being held in contact with the drum 150 through the medium of springs 155, the compression of which are adjustable through the adjusting nuts 156. Suitable ball bearings to provide for the proper operation of the clutch are indicated by the reference character 157. Within the sleeve 146 there is provided a plug 158 which is held therein by a set screw 159, and between the top of said plug and the bottom of the shaft 149 there is positioned a helical spring 160 which normally urges said shaft upwardly, the shaft being limited in its upward movement within the sleeve 146 by cooperating shoulders on the bottom of the shaft and the interior of said sleeve.

A disk-like element 80 provided with a cam track 81, in which is movable a roller 161 affixed to one end of a lever 162 which is pivoted to the frame at 163, functions through the agency of other connecting levers and mechanisms to (*a*) operate compressed air means for blowing out the valve stems both prior to the insertion of the valve inside therein and after such insertion and to operate a clamping head which positions and holds a valve stem against longitudinal movement while the valve insides is being screwed therein; (*b*) to operate means for unseating a valve inside after insertion into the valve stem so as to permit the compressed air to be blown through the valve stem; and (*c*) to move the valve insides supporting bushing which is carried by the turret 41, upwardly into close proximity to the end of the valve stem nipple at the time of the screwing of said insides into the valve stem and for simultaneously moving one of said valve inside supporting bushings upwardly into proximity of the feed opening at the valve insides feeding station. The mechanism for performing these various functions will now be described:

(*a*) Pivotally connected to the opposite end of the lever 162 is an upright lever 164 which is rigidly connected with a two-part lever 165, 166 which is adjustable through the agency of an adjustable link 169 to operate the clamping head, indicated generally by the reference character 170. To operate said clamping head, the top end of the lever 166 is pivotally connected with a lever 171, best seen at the center left of Fig. 1, the opposite end of said lever 171 being connected to a shaft 172 upon which is rigidly secured the clamping head operating lever 173. Also rigidly secured to the shaft 172 at the opposite ends thereof are operating levers 175 and 176 at substantially diametrically opposite points above the turret 35, said levers 175 and 176, in their pivotal movement controlling valves 177, through which compressed air supplied through the tubes 178 is adapted to pass. The end of the lever 170 opposite to that connected to the shaft 172 is bifurcated and straddles a tubular member 179 which supports a spring-pressed plunger 180 at the top of its piston rod 181, there being a helical spring 182 within the tubular member 179 and acting against the plunger head 180 to move the same relatively to the tubular member. The lower end of the plunger 180 is formed with a center pin 183 adapted to engage within the axial opening through a valve stem 184 at its foot to properly position said valve stem at the valve insides screwing-in station. The tubular member 179 is carried by the cover plate 107, which, as best shown in Fig. 7, is provided with a lateral flange 185, the lower end of which has a supplemental inturned flange 186 extending in the same planes as the turret element 35'. The levers 175 and 176, as stated, control valves 177 which permit air under pressure to flow through the pressure heads indicated generally by the numeral 190. These pressure heads are substantially similar in construction to the spring-pressed plunger head 180, excepting that the plunger rod 191 is hollow and is fitted at its lower end with a packing gasket 192 adapted to make a leak-tight joint with the underside of the foot portion of the valve stem when it comes to the air pressure testing station, said packing having an opening therethrough adapted to establish communication between the interior of the plunger rod which connects with the pressure supply and the axial opening of the valve stem. At the air pressure testing station to the right of Fig. 1, whereat the valve stem, when it reaches there, has no valve insides therein, no means are required to hold the valve of the valve insides in open position to permit air to pass therethrough.

(*b*) At the pressure testing station to the left of Fig. 1, whereat air under pressure is to be blown through the valve stem already supplied with a valve insides, means are necessary for opening and holding open the valve within the valve stem during said blowing operation. The means for accomplishing this are best shown in Figs. 14 and 16, and comprise a valve pin unseating means 193 passing through an opening in a spring-pressed engaging head 194 having a passage 195 extending therethrough, said engaging head 194 being carried by an element 196 which is fixedly mounted on a rod 197 to be movable therewith. The rod 197 is adapted to be moved simultaneously with the opening of the valve 177 by the cam lever 162, which also controls the movement of the operating means for opening the valve 177. Such movement of the lever 197 is accomplished through the connecting link 198, bell crank lever 199 and connecting links 200 and 201, said latter lever having its end fixed on shaft 163 so as to be movable in an arc therewith.

(*c*) To insure a proper reception of the valve insides within the valve insides receiving bushing in the turret 41 at the feeding-in station, and to insure proper transfer of the valve insides from such bushing to the valve stem at the screwing-in station, means are provided for moving the spring-pressed bushings upwardly into contact with the respective parts at said respective stations. The means which I have shown for accomplishing this at the valve insides feeding-in station is an upwardly moving plunger 202, shown in Figs. 14 and 26, the top of which plunger at its upward stroke is adapted to engage the bottom of a valve insides supporting bushing 203 carried within the turret 41, and move said bushing upwardly so that its tapered mouth 204 will fit over and enclose the correspondingly tapered nipple 205 at the bottom of the valve insides feeding-in station so that the valve insides in passing from the hopper guide to the bushing 203 will have an unbroken passage. Upward movement is communicated to the plunger rod 202 through the agency of the centrally pivoted lever 206 through connecting rod 207 and bracket 208 which is carried by lever 164, movement of which is controlled by cam element 80 and cam lever 162. Surrounding connecting rod 207 at its top is a helical spring 209 which presses down upon one end of lever 206 to normally urge the plunger 202 upwardly. Movement of the bushing 203 upwardly at the valve inside screwing-in station is accomplished by upward movement of a block 210 which is movable through the turret 41, said block having a pair of flanges 211 and 212 for limiting such movement with respect to said turret through movement of lift lever 213, which, in turn, is controlled by the cam lever 162 through connecting rod 164, to which is fixedly attached so as to be movable therewith, a lever 214 which is pivotally connected to one end of a lever 215 pivotally mounted at its center, the opposite end of said lever 215 connecting with the lift lever 213, all of which are best shown in Figs. 5 and 15. A helical spring 216 surrounds the lower end of the connecting rod 214 and serves to normally urge the lift lever 213 upwardly.

The turret 41 is formed with a plurality of sockets 220 extending parallel to the axis of the turret disposed in a circle adjacent the outer periphery of said turret. Within each of said sockets 220 there is disposed a valve insides receiving bushing 203, which bushing comprises a tubular member having a shoulder 221 against which the top of the valve insides rests when such insides is received therein in inverted position, and an external shoulder 224 adapted to support a helical spring 222 which normally urges said bushing downwardly, such downward movement being limited by the shoulder on a cap screw 223. The bottom end of the bushings are provided with a tapered recess 225 adapted to facilitate the entrance of the screw driver therein.

The valve insides 226 are fed to the bushings 203 singly in timed relation to the intermittent rotation of the turrets 41. This is accomplished in the following manner:

A mass of the insides are contained in a suitable vertically oscillating hopper 227 pivoted at 227' provided with a track 228 adapted to receive the valve insides 226 and support them in upright position by engagement with the shoulder of largest diameter of the valve insides, which part is the screw-threaded element 226' of the valve insides, from which slide 228 they are transferred to a second narrower slide or track 229 in which the valve insides is supported in upright position at the shoulder of smallest diameter of the valve seat element 226, namely, the valve seat proper of said insides 226². In other words, the width of the track 228 is sufficient to accommodate the body of the valve seat element, whereas track 229 is only sufficiently wide to accommodate the valve pin. Transfer of the valve insides from track 228 to track 229 is accomplished by extending track 229 backwardly to underlie track 228 so that the valve proper of the valve insides 226³ can engage below the track while the pin moves into said track. Hence, as the supported valve insides 226 moves down the incline 228' of the track 228, it will be seen that the support of the insides will be transferred from the shoulder 226' to the valve seat proper 226². From track 229 the insides are conducted down the inclined slide 230, forming a continuation thereof, until they reach the point 231, whereat there is provided control means for feeding the valve insides singly to the discharge end of the slide.

The valve insides single feed control means comprises a pair of oppositely directed fingers 232 and 232' carried by elements 233 and 233' affixed to a slide 234 movable within a housing 235 supported by the frame of the inclined slide 230. The free ends of the fingers are in slightly overlapped relation and are spaced apart a distance slightly greater than the diameter of the valve pin, so that as the slide 234 moves at right angles to the track 230, finger 232 will move with it, and when it has moved a distance sufficient to permit the valve insides which had its movement checked by said finger to pass down the slide to the discharge end thereof, finger 232' will have moved across the path of the next valve insides in line to temporarily check its further movement. A complete movement of the slide 234 to its first position will withdraw finger 232' so as to permit the valve insides next in line to advance slightly and to be checked by finger 232 as it moves across the slide. Movement of slide 234 is controlled by a cam 236 mounted on the secondary cam shaft 83, said cam 236 comprising a disk having a radial lug 237 adapted to engage the free end of a bell crank lever 238 and move a connecting rod 239 carried by the opposite end of the bell crank lever against the action of a spring 240. Pivotally mounted to a bearing element 241 carried by the rod 239 is a link 242 carried by a perpendicular rod 243, which rod at its top carries a link 244, connected, in turn, to the slide 234 through another link 245. The construction is such that as the lug 237 engages the free end of the bell crank lever 238 it moves the rod 239 and with it the link 242 to rotate the perpendicular rod 243, and through its connecting elements to move the slide 234 across the track 230. The lug 237 being in engagement with the rod 238 for but a brief instant, it will be apparent that due to the action of the spring 240 the bell crank lever 238 is thrown back to its original position, and in consequence thereof the slide 234 is brought back to its original position, thus completing a backward and forward movement of the fingers 232 and 232' to discharge a single valve insides.

The valve insides released from the control means just described continues down the slide 230, where at its terminus the valve insides is tripped by the engagement of the collar end of the valve insides with an abutment 246 which causes said insides to be inverted, so that when fed into the bushing 203 it will be in inverted position. A curved and inclined wall 247 at the foot of the slide 230 insures the proper inversion of the valve insides at the feeding-in station, as best shown in Fig. 21.

It is essential that the valve insides fed to the bushings 203 within the turret 41 be properly positioned therein, otherwise proper operation of the machine will be affected. To insure that each fed valve insides is properly positioned, I have provided a testing means which is so constructed that if the valve inside is not properly positioned, the testing means will operate a trip mechanism which will disengage the driving clutch of the machine.

The testing means which I have devised comprises a plunger rod 250 rigidly carried by an arm 251, which, in turn, is supported by a connecting rod 252 operated by a bell crank lever 253 pivotally mounted at 254 to a hanger carried by the base support 30. The free end of the bell crank lever carries a roller 255 which is held in engagement with the surface of a cam 256 mounted on the secondary cam shaft 83 through the agency of a spring 257 attached to the opposite arm of the bell crank lever. The cam 256 is provided with a hub 258 formed with a pawl 258'. Pivotally mounted at 259 from a bearing mounted on the sub-base 31 in proximity to said cam 256 is a bell crank lever 260. In proximity to this bell crank lever there is pivotally mounted a second bell crank lever 261, one arm 261' of which is hollow and provided with a spring-pressed pawl 262, which pawl has a pin 263 adapted to normally act against one arm of the bell crank lever 260. The second arm 261² of the bell crank lever 261 is held in a predetermined position through the medium of a connecting rod 264 resting upon the free end of a pivoted bell crank lever 265, the opposite end of which is pivotally connected to a spring-pressed plunger 266 which is formed at its free end with a holding pawl 267.

The operation of this testing device is as follows:

As the cam 256 rotates in a counter-clockwise direction, the roller 255 riding over its surface, upon engaging the rise in the cam moves the testing plunger rod 250 perpendicularly upward through the medium of the bell crank lever 253 and connecting parts 252 and 251, and as roller 255 engages the low of the cam, the spring 257 moves the plunger rod 250 downwardly into the valve insides feed station. When the lowest point of the cam is reached, the plunger 250 is at its maximum downward movement, or, in other words, extends slightly within the bushing 203 above the valve insides already therein. At this point the roller 255 engages one arm of the bell crank 260 to pivot the same so that the other arm of said bell crank will move the spring-pressed pawl 262 inwardly and permit the pawl 258 to clear it in passing. If the valve inside is not completely within the bushing 203, it will be apparent that the plunger rod 250 will engage said inside before it completes its downward stroke. The arresting of said plunger will prevent the engagement of the roller 255 with the bell crank 260 to operate the spring-pressed pawl 262, whereupon continued rotation of the cam 256, the pawl 258 will engage the spring-pressed pawl 262 to rotate the bell crank 261 upon its pivotal axis to move the connecting rod 264 down and thus move the spring-pressed holding pawl 267 to the left to disengage the collar 268 on the connecting rod 72, whereupon the spring 74 will move said rod 72, at the free end of which is the clutching element 57, out of clutching engagement and thus stop the machine.

During intermittent rotation of the turrets 35 and 41, it is desirable to temporarily lock said turrets for the periods during which the valve stems and valve insides are fed to said respective turrets and the screwing-in operation of the valve insides into the valve stem is taking place. To accomplish this I have provided a pair of spring-pressed locking pawls 270 and 271 held within the housings 272 and 273 respectively mounted on the base support 30 adapted to engage a tooth of the gears 37 and 43 of the turrets 35 and 41 respectively. The pawls 270 and 271 are simultaneously operable by movement of a pair of bell crank levers 274 mounted upon a common shaft 275 and operable through the movement of a roller 276 carried by one of the bell crank levers 274 over the surface of a cam 277 mounted on the secondary cam shaft 83.

The valve stems and valve insides after assembly are adapted to be discharged from the turret 35 at a point in advance of the valve stem feeding station by engagement with an abutment 280 carried at the underside of the top cover plate 107, said abutment lying in close proximity to the top of the turret 35 and extending angularly over the peripheral edge of said turret so as to engage the foot portions of the valve stems carried by the turret to move said valve stems out of their recesses 104, 105 in the turret 35 through a lateral opening 281 provided in the side wall 185 of the top cover plate at a point opposite the abutment 280. After discharge through said opening 281, the valve stems are received upon a chute 282 which delivers said assembled valve stems to suitable receptacles.

The valve stems, it will be apparent, may be automatically fed to the slide 102 through any approved type of feed hopper, and as herein illustrated, said feed hopper 103 is of the vertical oscillating blade type driven from the primary driving shaft 51. Preferably, the oscillation of the hopper blade is separately controlled, and for this purpose I have shown such control as comprising an operating lever 283 which is adapted to move a connecting rod 284 to operate a clutch 285 of any approved construction connected with the main driving shaft 51 to rotate a sprocket wheel 286 over which passes a sprocket chain 287, which, in turn, operates means (not shown) for oscillating the hopper blade. To insure movement of the fed valve stems down the slide 102, I have provided an agitator 288 connected to said inclined slide to agitate the same, said agitator being mounted upon a shaft 289, which, at its opposite end, carries a pawl 290 driven by a belt 291 passing over a pulley (not shown) driven by one of the rotating shafts for operating the feed hopper.

A hand wheel 293 connected to a shaft 294, which carries at its opposite end the bevel gear 55, is provided for the purpose of turning over the machine by hand when such operation is desired or found to be necessary.

The valve insides hopper 227, as stated, is of the vertical oscillatory type and is oscillated through the medium of a connecting rod 295 which is pivotally attached to the end of the long arm of a pivoted bell crank lever 296, the short arm of which carries a roller 297 movable over the surface of an operating cam 298. The cam 298 is carried upon a shaft 299, which also carries a driving gear 300 driven by an intermittent gear 301 in mesh with the gear 302 carried by the secondary cam shaft 83. Preferably, the active surface of the cam 298 is formed with a wavy surface 298' which serves to agitate the hopper while it is being oscillated.

The machine as thus described, it will be apparent, will accommodate valve stems of a standard length, since all adjustments and cam designs are such as to move the valve insides bushing 203 upwardly a predetermined distance. When it is desired to assemble valve stems of a different length, this can be accomplished by raising the distance of the turret 35 above the base support 31 through the interposition of washers 39 around the shaft 33 between the gear 36 and the underside of the turret element 35². To compensate for this elevation of the turret 35, a corresponding elevation must be accorded to the cover member 107 which carries the valve clamping means and compressed air blowing means. Such elevation of the cover 107 is accomplished by the interposition of washers 303 about the supporting bolts 108, all of which is best shown in Fig. 4.

*Operation.*—The machine as a whole is started through movement of the lever 70 which throws in clutch 56, 57 to operate the primary and secondary cam shafts, the movement of said lever 70 also functioning, through the connecting rod 304, to operate a lever 305 which controls a switch to start the screw driver motor 136. The various parts of the machine being now in motion, intermittent opposite rotary movement is communicated to the turrets 35 and 41 from the primary cam shaft through the elements 90 to 95, gear 34, shaft 33 and gear train 36, 97, 98 and 42. Coordinated with this intermittent movement are the movements of the valve stem finger feeds through cams 76 and 79 to singly feed valve stems to the turret 35; and the movements of the valve insides single feed control through the medium of cam 236. Also coordinated with this intermittent movement is the operation of cam 277 and its connecting elements. During the interim that the turrets are held against movement by the locking bolts 270 and 271, the cams 77 and 80 function (a) to operate the compressed air means 175 and 176, the latter being adapted to blow air through the valve stem before the valve inside is assembled therein, while the former is adapted to blow air through the valve stem after the valve insides is assembled therein, in which connection the valve unseating means 193 is also simultaneously operated; (b) to operate the clamping head 179, 180 to properly position and hold the valve stem stationary while the screw driver 151 is moved upwardly to screw the valve insides into said valve stem; (c) to simultaneously move the valve insides carrying bushings within the turret 41 at the valve insides screwing-in station and the valve insides feeding-in station upwardly into engagement with the valve stem and the bottom of the insides hopper respectively. During the time required for the completion of these operations the respective operating cams hold the parts in operative position. Upon completion of said functions, the cams in their further rotation withdraw the lock bolts and the Geneva moves the turrets to present the recesses or sockets of said turrets to their respective feeding stations to receive a valve part, whereupon the operations previously described are repeated. The assembled valve stems, after passing the compressed air blowing station, move into contact with the abutment 280 at the discharge station and are discharged from the turret 35.

If at the valve insides feeding-in station a valve insides is not properly fed to the receiving socket 203, the testing plunger 250 will operate to throw out the clutch 56, 57 and stop the machine. Also, should the machine become jammed for any reason and stop rotating, the friction clutch 53 will function to prevent the stopping of the motor 50. If at the valve insides screwing-in station for any reason the screw driver 151 is prevented from moving upwardly completely through the opening in the socket 203, the screw driver stem 149 will move downwardly within the sleeve 159 against the action of spring 160, and thus avoid interfering with the operation of the cam-controlled lever 140 or otherwise jamming the machine.

It will thus be seen from the foregoing description and accompanying drawings that I have provided an automatic machine adapted to accomplish the objects hereinbefore set forth and have provided certain instrumentalities for insuring and safeguarding the proper operation of the machine. While the foregoing disclosure embodies a preferred construction of my machine, I desire it to be understood that changes may be made in the various parts, in their arrangements, combinations and adjustments without departing from the spirit of the invention.

What I claim is:

1. A machine for assembling externally screw-threaded parts and internally screw-threaded parts together, comprising relatively movable means for successively presenting said respective parts to a point whereat they will be in superposed alined position and means for rotating one of said respective parts relatively to the other when in such alined position to cause one part to screw-threadedly engage the other part.

2. A machine for assembling externally screw-threaded parts and internally screw-threaded members together, comprising means for receiving the externally threaded parts, means movable relatively to the first-mentioned means for receiving the internally threaded members, means for presenting said parts and members to successively aline one of said parts in superposed relation with one of said members, and means for screwing an externally threaded part and an alined internally threaded member together.

3. A machine for assembling externally screw-threaded parts and internally screw-threaded members together, comprising means for receiving the externally threaded parts, means for receiving the internally threaded members, one of said means being movable transversely relatively to the other, means for feeding said receiving means to successively aline one of said parts in superposed relation with one of said members, and means for screwing an externally threaded part and an alined internally threaded member together.

4. A machine for assembling externally screw-threaded parts and internally screw-threaded members together, comprising movable means for receiving the externally threaded parts, means movable transversely relatively to said first means for receiving the internally threaded members, means for feeding said receiving means to successively aline one of said parts with one of said members, and means for screwing an externally threaded part into an alined internally threaded member.

5. A machine for assembling externally screw-threaded parts and internally screw-threaded members together, comprising movable means for receiving the externally threaded parts, means movable transversely relatively to said first means for receiving the internally threaded members, means for feeding said parts and said members singly in timed relation to their respective receiving means, means for moving said receiving means to successively aline one of said parts with one of said members, and means for screwing an externally threaded part into an alined internally threaded member.

6. A machine for assembling externally screw-threaded parts into internally screw-threaded members, comprising a pair of relatively rotatable superposed turrets having spaced openings therein, said turrets being so positioned relatively to each other that at a given point the openings in one have a common axis with the openings in the other, and a screw driver movable along said axis.

7. A machine for assembling externally screw-threaded parts into internally screw-threaded members, comprising a pair of relatively rotatable turrets having spaced openings therein, said turrets being so positioned relatively to each other that at a given point the openings in one have a common axis with the openings in the other, means for intermittently moving said turrets to successively bring the openings in one turret into superposed alinement with the openings in the other turret at said given point, a screw driver movable along said axis, and means for moving the screw-driver along said axis every time a pair of openings are brought into alinement.

8. A machine for assembling externally screw-threaded parts into internally screw-threaded members, comprising a pair of relatively rotatable turrets having spaced openings therein, said turrets being so positioned relatively to each other that at a given point the openings in one have a common axis with the openings in the other, a screw driver movable along said axis, means for intermittently moving said turrets to successively bring the openings in one turret into alinement with the openings in the other turret at said given point, means for temporarily locking said turrets every time a pair of openings are in alinement, and means for moving the screw-driver along said axis during such locking engagement.

9. A machine for assembling externally screw-threaded parts into internally screw-threaded members, comprising a pair of rotatable turrets, having spaced openings therein, means for feeding said parts and said members singly in timed relation to the openings in the respective turrets, means for intermittently moving said turrets relatively to each other to successively bring the openings in one turret into superposed alinement with the openings in the other turret at a given point and means for rotating a part and member relatively to each other when they reach said given point to cause said member and part to become screw-threadedly assembled.

10. A machine for assembling externally screw-threaded parts into internally screw-threaded members, comprising a pair of rotatable turrets having spaced openings therein, means for feeding said parts and said members singly in timed relation to the openings in the respective turrets, means for intermittently moving said turrets relatively to each other to successively bring the openings in one turret into alinement with the openings in the other turret at a given point, and a screw-driver movable to screw the externally threaded part into its alined internally threaded member at the time said part and member are in alinement.

11. A machine for assembling tire valves or the like, comprising means for receiving valve stems, means for receiving valve insides, means for feeding said parts to their respective receiving means, means for alining a valve stem and a valve insides when in their respective receiving means, and a screw-driver for screwing the valve insides into the valve stem in alinement therewith when said parts are in such alinement.

12. A machine for assembling tire valves or the like, comprising means for receiving valve stems, means for receiving valve insides, means for feeding said parts to their respective receiving means, one of said receiving means being movable relatively to the other, means for alining a valve stem and a valve insides when in their respective receiving means, and a screw-driver for screwing the valve insides into the valve stem in alinement therewith when said parts are in such alinement.

13. A machine for assembling tire valves or the like, comprising means for receiving valve stems, means for receiving valve insides, means for feeding said parts singly in timed relation to their respective receiving means, both of said receiving means being movable relatively to each other, means for alining a valve stem and a valve insides when in their respective receiving means, and a screw-driver for screwing the valve insides into the valve stem in alinement therewith when said parts are in such alinement.

14. A machine for assembling tire valves or the like, comprising means for receiving valve stems, means for receiving valve insides, means for feeding said parts singly in timed relation to their respective receiving means, both of said receiving means being movable relatively to each other, means for alining a valve stem and a valve insides when in their respective receiving means, a screw-driver for screwing the valve insides into the valve stem in alinement therewith when said parts are in such alinement, and means for blowing air through the valve stem before and after the valve insides is assembled therein.

15. A machine for assembling valve insides into valve stems having enlarged foot portions, comprising means for receiving and supporting the valve stems by their foot portions, means having sockets for receiving the valve insides, means for moving one of said receiving means relatively to the other receiving means to successively bring the axes of the sockets and the axes of the valve stem supporting means into alinement at a given point, and a screw-driver movable along the common axis of alinement into the socket member.

16. A machine for assembling valve insides into valve stems having enlarged foot portions, comprising means for receiving and supporting the valve stems by their foot portions so that their body portions hang downwardly, means having sockets for receiving the valve insides with the top of the valve insides at the bottom of the socket, the valve inside receiving means being in a plane below the lowermost portions of the supported valve stems, means for moving one of said receiving means relatively to the other receiving means to successively bring the axes of the sockets and the axes of the valve stem supporting means into alinement at a given point, means for temporarily holding said parts in said position, and a screw-driver below the valve inside receiving means movable upwardly along the common axis at the given point into the socket during said temporary arresting of said parts.

17. A machine for assembling valve insides into valve stems having enlarged foot portions, comprising means for receiving and supporting the valve stems by their foot portions so that their body portions hang downwardly, means having sockets for receiving the valve insides with the top of the valve insides at the bottom of the socket, the valve inside receiving means being in a plane below the lowermost portions of the supported valve stems, means for feeding said valve stems and said valve insides singly in timed relation to their respective receiving members, means for moving both of said receiving means relatively to each other to bring the axes of the sockets and the axes of the valve stem supporting means into alinement at a given point, means for temporarily holding said parts in said position, a screw-driver below the valve inside receiving means movable upwardly along the common axis at the given point during said temporary arresting of said parts, to screw the valve insides into the valve stem and means for clamping down the foot of the valve stem at the screwing-in position during the screwing-in operation.

18. A machine for assembling valve insides into valve stems having enlarged foot portions, comprising means for receiving and supporting the valve stems by their foot portions so that their body portions hang downwardly, means having sockets for receiving the valve insides with the top of the valve insides at the bottom of the socket, the valve inside receiving means being in a plane below the lowermost portions of the supported valve stems, means for feeding said valve stems and said valve insides singly in timed relation to their respective receiving members, means for moving both of said receiving means to bring the axes of the sockets and the axes of the valve stem supporting means into alinement at a given point, means for temporarily holding said parts in said position, a screw-driver below the valve inside receiving means movable upwardly along the common axis at the given point during said temporary arresting of said parts, to screw the valve insides into the valve stem, means for clamping down the foot of the valve stem at the screwing-in position during the screwing-in operation, and valve controlled means operable to blow air through the valve stems mounted in the valve stem receiving means both before and after the valve insides are assembled in said valve stems.

19. A machine for assembling tire valves or the like, comprising a pair of rotatable superposed turrets having spaced openings therein adapted to receive respectively, valve stems in inverted position in the upper turret and valve insides in inverted position in the lower turret, means for intermittently moving said turrets relatively to each other to successively bring the openings in one turret in alinement with the openings in the other turret at a given point, and means for feeding valve stems and valve insides in inverted position to the respective turrets in timed relation to the movements of said turrets.

20. A machine for assembling tire valves or the like, comprising a pair of rotatable turrets having spaced openings therein adapted to receive respectively, valve stems and valve insides, means for intermittently moving said turrets relatively to each other to successively bring the openings in one turret in alinement with the openings in the other turret at a given point, means for feeding valve stems and valve insides to the respective turrets in timed relation to the movements of said turrets, and a screw-driver movable along the axis of alinement of the openings in the turrets every time a pair of openings are brought into alinement.

21. A machine for assembling tire valves or the like, comprising a pair of rotatable turrets having spaced openings therein adapted to receive respectively, valve stems and valve insides, a Geneva movement for intermittently moving said turrets relatively to each other to successively bring the openings in one turret in alinement with the openings in the other turret at a given point, cam operated means for feeding valve stems and valve insides to the respective turrets in timed relation to the movements of said turrets, and a screw-driver movable along the axis of alinement of the openings in the turrets by a cam every time a pair of openings are brought into alinement, said Geneva movement, cam-operated feeding means and screw-driver cam being all operated from a common driving shaft.

22. A machine for assembling tire valves or the like, comprising a rotatable turret having spaced peripheral radial recesses adapted to receive valve stems and support them by their foot portions in inverted position, a fixed cover plate overlying said turret and spaced from the valve stem supporting part a distance greater than the thickness of the valve stem foot portion, and an abutment on said plate in close proximity to the top of valve stem supporting part of the turret extending over and inclined angularly to the radial peripheral recesses in the turret, adapted to engage the foot portions of the valve stems carried by the turret to move said valve stems out of said recesses.

23. A machine for assembling tire valve stems or the like, comprising movable means having recesses therein adapted to receive valve stems in inverted position, means for feeding valve stems singly in inverted position to said recesses, means for intermittently advancing said movable valve stem receiving means to present a recess in alinement with the feeding means, the movements of the means for feeding the valve stems and the means for advancing the valve stem receiving means being time controlled by mechanisms operable from the same shaft.

24. A machine for assembling tire valve stems or the like, comprising movable means having lateral recesses therein adapted to receive valve stems, means for feeding valve stems singly to said recesses, means for intermittently advancing said movable valve stem receiving means to present a lateral recess in alinement with the feeding means, said feeding means comprising a slide or track in which the valve stems supported by their foot portions are movable, front and rear spaced feed arms near the discharge end of the slide, each of said arms having means engageable with the valve stems to insure the single feeding of the valve stems to the lateral recesses in the valve stem receiving means, and means for operating said feed arms.

25. A machine for assembling tire valve stems or the like, comprising movable means having lateral recesses therein adapted to receive valve stems, means for feeding valve stems singly to said recesses, means for intermittently advancing said movable valve stem receiving means to present a lateral recess in alinement with the feeding means, said feeding means comprising a slide or track in which the valve stems supported by their foot portions are movable, front and rear spaced feed arms near the discharge end of the slide, the front feed arm having a resiliently mounted hook-like member engageable behind the lowermost valve stem in the slide to move said valve stem into a lateral recess in the valve stem receiving means, and means for operating said feed arm.

26. A machine for assembling tire valve stems or the like, comprising movable means having lateral recesses therein adapted to receive valve stems, means for feeding valve stems singly to said recesses, means for intermittently advancing said movable valve stem receiving means to present a lateral recess in alinement with the feeding means, said feeding means comprising a slide or track in which the valve stems supported by their foot portions are movable, front and rear spaced feed arms near the discharge end of the slide, the rear feed arm having a pair of spring pressed fingers adapted to engage the body of a valve stem to push said valve stem toward the bottom of the slide, and means for operating said feed arm.

27. A machine for assembling tire valve stems or the like, comprising movable means having lateral recesses therein adapted to receive valve stems, means for feeding valve stems singly to said recesses, means for intermittently advancing said movable valve stem receiving means to present a lateral recess in alinement with the feeding means, said feeding means comprising a slide or track in which the valve stems supported by their foot portions are movable, front and rear spaced feed arms near the discharge end of the slide, the front feed arm having a resiliently mounted hook-like member engageable behind the lowermost valve stem in the slide to move said valve stem into a lateral recess in the valve stem receiving member, the rear feed arm having resiliently mounted means for urging the valve stems toward the bottom of the slide, the movements of the front and rear feed arms being so coordinated that as the front feed arm moves rearwardly to engage the lowermost valve stem in the slide, the rear feed arm will hold the valve stems to the rear of said lowermost valve stem stationary so that the resiliently mounted hook-like member can engage behind said valve stem.

28. A machine for assembling tire valve stems or the like, comprising movable means having lateral recesses therein adapted to receive valve stems, means for feeding valve stems singly to said recesses, means for intermittently advancing said movable valve stem receiving means to present a lateral recess in alinement with the feeding means, said feeding means comprising a slide or track in which the valve stems supported by their foot portions are movable, front and rear spaced feed arms near the discharge end of the slide, the front feed arm having a resiliently mounted hook-like member engageable behind the lowermost valve stem in the slide to move said valve stem into a lateral recess in the valve stem receiving member, the rear feed arm having resiliently mounted means for urging the valve stems toward the bottom of the slide, the movements of the front and rear feed arms being so coordinated that as the front feed arm moves rearwardly to engage the lowermost valve stem in the slide, the rear feed arm will hold the valve stems to the rear of said lowermost valve stem stationary so that the resiliently mounted hook-like member can engage behind said valve stem, the movements of the feed arms, and the means for advancing the valve stem receiving means being operated and time controlled by mechanisms operable from the same shaft.

29. A mechanism for assembling tire valve, stems or the like, comprising movable means having recesses therein adapted to receive valve insides therein in inverted position, means for feeding valve insides singly in inverted position to said recesses, means for intermittently advancing the movable valve insides receiving means to present a receiving recess below the discharge end of the valve insides feeding means, the movements of the valve insides feeding means and the means for advancing the movable valve insides receiving means being time-controlled by mechanisms operable from the same shaft.

30. A mechanism for assembling tire valve stems or the like, comprising movable means having recesses therein adapted to receive valve insides, means for feeding valve insides singly to said recesses, and means for intermittently advancing the movable valve insides receiving means to present a receiving recess below the discharge end of the valve insides feeding means, said feeding means comprising an inclined track in which the valve insides supported at their valve seats are movable, and a pair of fingers located over said track near the discharge end thereof, said fingers being so co-ordinated that as the front finger moves to release a valve insides the rear finger moves to temporarily check the movement of the valve insides next in line until the first finger is again moved to its former position.

31. A mechanism for assembling tire valve stems or the like, comprising movable means having recesses therein adapted to receive valve insides, means for feeding valve insides singly to said recesses, means for intermittently advancing the movable valve insides receiving means to present a receiving recess below the discharge end of the valve insides feeding means, said feeding means comprising an inclined track in which the valve insides supported at their valve seats are movable, and a pair of fingers located over said track near the discharge end thereof. said fingers being so co-ordinated that as the front finger moves to release a valve insides the rear finger moves to temporarily check the movement of the valve insides next in line until the first finger is again moved to its former position, said fingers being spaced apart, oppositely directed and formed with beveled ends, and being movable as a unit by a cam-operated lever in timed relation to the movement of the movable valve insides receiving means.

32. A hopper for feeding in upright position valve insides or like elements having a pin with an enlarged shoulder intermediate the ends of the pin and a movable part slidable on said pin, said movable part having a plurality of shoulders by which it is adapted to be supported, comprising an inclined track adapted to receive and support the movable part of said elements in upright position at their largest diameter, a second track adapted to support the movable part of said elements at their smallest diameter, and means for conveying the supported elements from their first position to their second position.

33. A hopper for feeding valve insides or the like having a valve pin with an enlarged valve plunger fixed thereon intermediate the ends of the pin, a valve spring and spring cup on said pin between said plunger and one end of the pin, and a valve seat element loosely mounted on the pin between said plunger and the other end of the pin, said valve seat element having a plurality of shoulders of different diameters by which it can be supported in upright position, comprising an inclined track or slide adapted to receive and support said valve insides in upright position by engagement with the shoulder of largest diameter of the valve seat element, a second track adapted to support the valve insides in upright position at the shoulder of smallest diameter of the valve seat element, and means for conveying the valve insides from their first supported position to their second supported position.

34. A mechanism for assembling tire valve stems or the like, comprising a movable element having spaced openings therein adapted to receive parts fed thereto, which parts when properly positioned seat entirely within said openings below the top of the movable element, means for intermittently moving said movable element, means for feeding the parts to the openings in said elements in timed relation, means at said feeding-in station for testing whether said fed parts are properly seated in said openings, said testing means being operable in timed relation to the movements of the movable means and the feeding means from a common driven shaft, and means operable by the testing means to stop the motion of the machine if a fed part does not properly seat within the receiving opening.

35. A mechanism for assembling tire valve stems or the like, comprising a rotatable turret having spaced openings therein adapted to receive valve insides, which when properly positioned therein seat below the top of said openings in the turret, means for intermittently rotating said turret to successively present the openings therein before a feeding station, means for feeding the valve insides to said turret in timed relation, means at the feeding station for testing whether a fed valve insides is properly seated in the turret opening, said testing means being operable in timed relation to the movement of the turret and feeding means, and means operable by the testing means to stop the motion of the machine if the fed valve insides is not properly seated within the turret opening.

36. A mechanism for assembling tire valve stems or the like, comprising a rotatable turret having spaced openings therein adapted to receive valve insides, which when properly positioned therein seat below the top of said openings in the turret, means for intermittently rotating said turret to successively present the openings therein before a feeding station, means for feeding the valve insides to said turret in timed relation, means at the feeding station for testing whether a fed valve insides is properly seated in the turret opening, said testing means comprising a cam-operated plunger movable into the top of the turret opening in timed relation after the valve insides is fed therein, said plunger being adapted to operate a trip mechanism for stopping motion of the machine if the movement of said plunger is arrested before it reaches the limit of its downward stroke.

37. A machine for assembling externally screw-threaded parts and internally screw-threaded members together, comprising movable means for receiving the externally threaded parts, means movable relatively to said first means for receiving the internally threaded members, means for feeding said parts and members to successively aline one of said parts with one of said members, and means for screwing an externally threaded part into an alined internally threaded member, said last-named means being a screw-driver movable along the common axis of the alined externally and internally screw-threaded parts into operative position when a pair of parts to be assembled reach the axis of alinement.

38. A machine for assembling externally screw-threaded parts and internally screw-threaded members together, comprising movable means for receiving the externally threaded parts, means movable relatively to said first means for receiving the internally threaded members, means for feeding said parts and members to successively aline one of said parts with one of said members, and means for screwing an externally threaded part and an alined internally threaded member together, said last-named means being a frictionally-driven screw-driver movable along the common axis of the alined externally and internally screw-threaded parts into operative position when a pair of parts to be assembled reach the axis of alinement, the driving frictional engagement of the screw-driver being such as will cause the driving and driven parts to frictionally slip when a part and a member have reached the limit of their screw-threaded engagement.

39. A machine for assembling externally screw-threaded parts and internally screw-threaded parts together, one of said parts being provided with a packing gasket adapted to provide a leak-tight joint between the assembled parts, comprising movable means for receiving the externally threaded parts, means movable relatively to said first means for receiving the internally threaded parts, means for feeding said respective parts singly in timed relation to their respective receiving means, means for successively alining one of the externally threaded parts with one of the internally threaded parts, and a frictionally-driven screw-driver movable along the common axis of the alined parts into operative engagement with one of said parts when a pair of said parts reach the axis of alinement, the driving frictional engagement of the screw-driver being adjustable so that the screw-driver will slip when the packing gasket adapted to provide the leak-tight engagement between the assembled parts has been subjected to the proper degree of compression.

40. A machine for assembling tire valves or the like, comprising means for receiving valve stems, means relatively movable to said first-named means for receiving valve insides, means for feeding said parts to their respective receiving means, means for alining a valve stem and a valve insides when in their respective receiving means, and a screw-driver for screwing the valve insides into the valve stem in alinement therewith when said parts are in such alinement, said screw-driver being frictionally driven and longitudinally movable along the common axis of the valve parts when they are in alinement, to screw the valve insides into the valve stem.

41. A machine for assembling tire valves or the like, comprising means for receiving valve stems, means for receiving valve insides, means for feeding said parts to their respective receiving means, means for alining a valve stem and a valve insides when in their respective receiving means, and a screw-driver for screwing the valve insides into the valve stem in alinement therewith when said parts are in such alinement, said screw-driver being frictionally driven and longitudinally movable along the common axis of the valve parts when they are in alinement, to screw the valve insides into the valve stem, and said screw-driver being resiliently mounted so that should its longitudinal movement into operative engaging position with the valve insides be obstructed, it will yield without doing injury to its operating mechanism.

42. A machine for assembling tire valves or the like comprising a frictionally-driven screw-driver adapted to be moved into engagement with a valve inside to screw it into a valve stem when said valve parts are brought into alinement, said screw-driver being rotatably driven by a source of power independent of that which moves the screw-driver into and out of engagement with the valve insides.

43. A machine for assembling tire valves or the like comprising a frictionally-driven resiliently-mounted screw-driver adapted to be moved through a cam-operated lever into engagement with a valve inside to screw it into a valve stem when said valve parts are brought into alinement, and out of such engagement when the valve insides is screwed home within the valve stem, said screw-driver being rotatably driven by a source of power independent of that which moves the screw-driver into and out of engagement with the valve insides, said resilient mounting being such that should the further movement of the screw-driver after engagement with the valve insides to screw the valve insides into the valve stem be obstructed, the screw-driver will yield without doing injury to its operating mechanism.

44. A machine for assembling valve insides into valve stems comprising means for receiving and supporting the valve stems, means having sockets provided with movable bushings for receiving the valve insides, means for moving at least one of said receiving means relatively to the other to bring the axes of the valve stem supporting means and the sockets into superposed alinement at a given point, and means for moving a bushing within the socket member toward the valve stem supporting means at the given point of alinement.

45. A machine for assembling valve insides into valve stems comprising a rotatable turret for receiving and supporting the valve stems, a second turret rotatable in a plane parallel to the first turret and spaced therefrom, having sockets provided with bushings for receiving the valve insides, said bushings being movable within the socket in said turret parallel to the axis of the turret, means for moving one of said turrets relatively to the other to bring the axes of the valve stem supporting means and the bushings into superposed alinement at a given point, and means for moving a bushing toward the valve stem supporting means at the given point of alinement.

46. A machine for assembling valve insides into valve stems comprising a rotatable turret for receiving and supporting the valve stems, a second turret rotatable in a plane parallel to the first turret and spaced therefrom, having sockets for receiving the valve insides, said sockets being movable within said turret parallel to the axis of the turret, means for moving one of said turrets relatively to the other to bring the axes of the valve stem supporting means and the sockets into superposed alinement at a given point, means for varying the distance between the planes of said turrets so that valve stems of different lengths can be accommodated by the first-mentioned turret, and means for moving a socket member toward the valve stem supporting means at the given point of alinement.

47. A machine for assembling valve insides into valve stems having enlarged foot portions, comprising a rotatable turret having means for receiving and supporting the valve stems by the foot portions, a second turret rotatable in a plane parallel to the first turret below said turret, having sockets extending parallel to the axis of the turret, said sockets each having a spring-pressed sleeve adapted to hold a valve insides in inverted position and to be moved upwardly against the action of the spring, means for rotating said turrets relatively to each other to bring the axes of the valve stem supporting means and the axes of the socket sleeves into superposed alinement at a given point, means for moving a sleeve upwardly against the action of its spring toward the first turret, and a screw-driver movable along the common axis of alinement into the socket member, the last-named means and the screw-driver being operative each time a sleeve reaches the given point of alinement.

In witness whereof, I have hereunto signed my name.

CHARLES J. SPILL.